United States Patent [19]

Guns et al.

[11] Patent Number: 4,906,745
[45] Date of Patent: Mar. 6, 1990

[54] PROCESS FOR MAKING STARCH ETHERS

[75] Inventors: Jacobus Guns, Hoogezand; Ido P. Bleeker, Groningen; Johannes W. Gielen, Veendam, all of Netherlands

[73] Assignee: Cooperatieve Verkoop-en Productievereniging ran Aardappelmeel en Perivaten 'Avebe' B.A., Netherlands

[21] Appl. No.: 320,472

[22] Filed: Mar. 8, 1989

[30] Foreign Application Priority Data

Mar. 16, 1988 [NL] Netherlands .......................... 8800647

[51] Int. Cl.$^4$ ........................ C08B 31/08; C07H 15/04
[52] U.S. Cl. ...................................... 536/111; 536/120
[58] Field of Search ................................ 536/111, 120

[56] References Cited

U.S. PATENT DOCUMENTS 4,663,159  5/1987  Brode, II et al. ...................... 536/43
4,801,699  1/1989  Jobe et al. .............................. 536/59

Primary Examiner—Ronald W. Griffin
Assistant Examiner—Pamela S. Webber

[57] ABSTRACT

A process for the dry etherification of granular starch is disclosed. The process is carried out in the presence of an alkaline catalyst and water, and in the presence of an organic acid in the solid state, which organic acid has a solubility at 25° C. ranging from 0.2 to 5 g in 100 g water. Examples of suitable organic acids are fumaric acid and adipic acid.

5 Claims, No Drawings

PROCESS FOR MAKING STARCH ETHERS

This invention relates to processes for the dry etherification of granular starch in the presence of an alkaline catalyst and water. Dry etherification, as used herein, means etherifications in which the moisture content during the etherification reaction is below 40% by weight of the reaction mixtures. Such processes are sometimes also defined as semi-dry etherification or etherification under substantially dry reaction conditions.

The dry etherification of starch for the manufacture of carboxymethyl starch and cationic starch ethers, among other products, has frequently been described in the literature. A survey of the literature concerned is given in the book by O. B. Wurzburg (Ed.), Modified Starches: Properties and Uses, CRC, Press, Boca Raton, Fla. (1986).

Commonly, an alkaline catalyst is used in the dry etherification of starch. The result is that the end product of the etherification reaction generally has an alkaline character. This has some disadvantages. When these alkaline starch products are dissolved by being heated in water, this may in some cases be accompanied by the undesirable formation of dust and a bad smell. This may result in irritation in attendant personnel. In addition, precipitate and turbidity may be formed in the resulting alkaline starch solutions, which is also undesirable. Furthermore, scale may be formed in equipment (jet cookers and the like). All this may result in equipment and filters becoming clogged to a greater or lesser extent.

It is known to obviate the disadvantages set forth above by adding an acid to the reaction mixture after the completion of the etherification reaction, and to mix the total mixture in the substantially dry state. As a result, a more or less neutralized dry end product is obtained. This addition and the mixing treatment after completion of the reaction, however, are disadvantageous, because the extra mixing procedure requires additional equipment and cost.

According to the present invention, there is provided a process for the dry etherification of starch in the presence of an alkaline catalyst and water, and is characterized in that, during the etherification reaction, there is also present an organic acid in the solid state which is poorly soluble in water. The organic acid used has, at 25° C., a solubility of more than 0.2 g and less than 5 g in 100 g water. Examples of suitable organic acids are fumaric acid (solubility at 25° C. is 0.6 g per 100 g water) and adipic acid (solubility at 25° C. is 1.9 g per 100 g water).

In practice the organic acid is added in the solid state in the so-called mixing phase, when the reaction components (starch, etherifying reactant, alkaline catalyst) are mixed with each other, and the actual etherification still has to begin or has only just begun. As a consequence, the performance of an additional mixing procedure after completion of the reaction is avoided.

In the process according to this invention, the organic acid is dissolved to a slight extent only during the reaction, as a consequence of which the reaction mixture remains alkaline in the desired degree during the etherification, in spite of the presence of the organic acid. As a result, the reaction efficiency of the etherification reaction is not reduced or to a surprisingly slight extent only. When the ultimate reaction mixture is dissolved by heating in water at higher temperatures, the organic acid is dissolved, so that a neutralized starch solution is obtained. This is not attended by the above drawbacks resulting from dissolving dry alkaline starch products, such as dust formation, smell formation, irritation, the formation of precipitate, turbidity, and scale.

In principle, the process according to the invention can be used in the manufacture of all starch ethers in the granular form by means of dry reaction techniques. Examples of starch ethers which can be made in this manner are carboxymethyl starch and the cationic starch ethers. Various dry reaction techniques can be used, such as etherification in suitable types of mixers, in autoclaves, and in other heated reactors. Furthermore, the process according to the invention is highly suitable for carrying out dry etherifications of granular starch, in which first the various reaction components are mixed and subsequently the reaction mixture is transferred to a silo or a suitable packing container, in which the dry etherification of the starch largely takes place.

Starting materials suitable for the process according to the invention are all native starches, such as potato starch, maize starch, wheat starch, tapioca starch and waxy maize starch. These starches may, before the performance of the dry etherification, be already modified by esterification, etherification, cross-linking, oxidation, and/or acid modification.

As with all dry reactions with starch, some moisture must be present in the reaction mixture. According to this invention, 5 to 40% by weight of mixture must be present in the reaction mixture. Preferably the moisture content during the etherification reaction ranges from 15 to 30% by weight of the total reaction mixture.

The dry etherification according to the invention is carried out at temperatures preferably ranging from 5° to 100° C. The time needed to carry out the etherification depends on many factors, such as the nature and concentration of the reaction components, reaction technique and reaction temperature. The reaction period preferably ranges from 0.3 hours to several months.

As the alkaline catalyst, any chemical can be used which has alkaline properties, such as sodium hydroxide, potassium hydroxide, calcium hydroxide, calcium oxide and/or an organic base. The quantity of catalyst depends on the quantity and type of etherifying agent, among other factors.

The proportion of organic acid to be used according to the invention depends on many factors, such as the nature and proportion of the etherifying reactant, the nature and proportion of the alkaline catalyst, the acid used, and the degree of neutralization desired to be achieved in dissolving the final product. Preferably, the proportion of organic acid added ranges from 0.3 to 10% by weight of the reaction mixture.

The products obtained by the process according to this invention can be used in the paper making industry (wet-end additive; surface sizing), the adhesives industry and various other industries.

The invention is illustrated in and by the following examples.

EXAMPLE 1

In a mixer having a capacity of 5 l (brand: Papenmeier), equipped with a stirrer, 2 kg potato starch is introduced (moisture content 20% by weight). The mixing vessel is cooled by means of a jacket to a temperature of 15° C. 2 g of fluxing agent (Aerosil) is added, and admixed for 5 minutes. Subsequently, 200 g of sodium hydroxide (in the solid form) is added. After a stirring period of 2 hours, 290 g sodium monochloroacetate and 145 g powdered fumaric acid are added. After a stirring period of 15 minutes, the mixture is transferred to a tubular reactor with a capacity of 15 l. This reactor is heated in a water bath while being rotated up to 75° C. After 1 hour's reaction, the reaction product is poured out of the reactor and cooled in the air. The product thus obtained is designated 1A.

A second test is conducted in a similar manner, except that no fumaric acid is added. The product thus obtained is designated 1B.

The reaction efficiency and the degree of substitution introduced (D.S.) of products 1A and 1B are set forth in the following table.

|  | Product 1A | Product 1B |
|---|---|---|
| D.S. (carboxymethyl) | 0.20 | 0.21 |
| reaction efficiency | 80% | 84% |

EXAMPLE 2

In a mixer with a capacity of 5 l (brand Papenmeier), equipped with a stirrer, 2 kg potato starch (moisture content 20%) is introduced. The mixing vessel is cooled to 13° C. 2 g fluxing agent (Aerosil) is added and admixed for 5 minutes. Subsequently, 32 g sodium hydroxide (solid) is added and mixing is continued for a period of 2 hours. Thereafter the mixture is transferred to a different mixer (Hobart). Dropwise, and with stirring, 125.3 g of a solution of 3-chloro-2-hydroxypropyl-trimethyl ammonium chloride (containing 60 g active cationic reactant per 100 g solution) are added. Thereafter, 24.0 g fumaric acid in the powdered form is added, and mixing is continued for another 30 minutes. The resulting mixture is transferred to a plastics polyethylene bag, which is sealed. After keeping for 5 days at ambient temperature (20° to 24° C.), the starch product is analyzed for its nitrogen content. The resulting product is designated as 2A.

In a second run the same procedure is followed, except that no fumaric acid is added. The resulting product is designated 2B.

The nitrogen contents and the reaction efficiency of the products 2A and 2B are set forth below:

|  | Product 2A | Product 2B |
|---|---|---|
| nitrogen content (% of dry solids) | 0.323 | 0.323 |
| Efficiency (%) | 98 | 98 |

EXAMPLE 3

Two cationic starch ethers are produced, using identical equipment and reaction conditions as set forth in Example 2.

In the first test, after the addition of the cationic reactant, 29.5 g adipic acid is added, followed by mixing for 30 minutes in the Hobart mixer. The mixture is then transferred to a plastics bag, which is sealed, whereafter the reaction is continued for 5 days at ambient temperature (20° to 24° C.). The resulting cationic starch ether is designated 3A.

In a second experiment, the same procedure is followed, except that no adipic acid is added. This product is designated 3B.

The nitrogen contents and the reaction efficiency of the products 3A and 3B are set forth below.

|  | Product 3A | Product 3B |
|---|---|---|
| Nitrogen content added (% of dry starch) | 0.330 | 0.330 |
| Nitrogen content in starch product | 0.315 | 0.323 |
| Efficiency % | 95 | 98 |

We claim:

1. A process for the dry etherification of granular starch in the presence of an alkaline catalyst and water, comprising carrying etherification in one step, at a temperature or from 5° to 100° C. and in a reaction mixture containing an organic acid in a solid state, which organic acid at 25° C. has a solubility ranging from 0.2 to 5 g in 100 g water, the proportion of organic acid ranging from 0.3 to 10% by weight of the reaction mixture and the moisture content of the reaction mixture during the etherification ranging from 5 to 40% by weight.

2. A process as claimed in claim 1, wherein the organic acid is fumaric acid.

3. A process as claimed in claim 1, wherein the organic acid is adipic acid.

4. A process as claimed in claim 1, wherein carboxymethyl starch is made.

5. A process as claimed in claim 1, wherein cationic starch ethers is made.

* * * * *